United States Patent
Alessi

(10) Patent No.: US 9,915,816 B2
(45) Date of Patent: *Mar. 13, 2018

(54) SYSTEM AND METHOD FOR MOUNTING A SPECIMEN ON A SLIDE

(71) Applicant: Alessi Technologies, LLC, Ann Arbor, MI (US)

(72) Inventor: Vincent Alessi, Ann Arbor, MI (US)

(73) Assignee: Aquaro Histology, Inc., Ann Arbor, MI (US)

( * ) Notice: Subject to any disclaimer, the term of this patent is extended or adjusted under 35 U.S.C. 154(b) by 427 days.

This patent is subject to a terminal disclaimer.

(21) Appl. No.: 14/696,096

(22) Filed: Apr. 24, 2015

(65) Prior Publication Data

US 2015/0226951 A1 Aug. 13, 2015
US 2017/0329119 A9 Nov. 16, 2017

Related U.S. Application Data

(63) Continuation of application No. 13/153,049, filed on Jun. 3, 2011, now Pat. No. 9,042,013.

(60) Provisional application No. 61/351,180, filed on Jun. 3, 2010.

(51) Int. Cl.
| | |
|---|---|
| *G02B 21/26* | (2006.01) |
| *G02B 21/34* | (2006.01) |
| *G02B 7/00* | (2006.01) |
| *G02B 21/28* | (2006.01) |
| *G02B 21/30* | (2006.01) |

(52) U.S. Cl.
CPC .............. *G02B 21/34* (2013.01); *G02B 7/008* (2013.01); *G02B 21/28* (2013.01); *G02B 21/30* (2013.01); *G02B 21/26* (2013.01); *Y10S 359/90* (2013.01)

(58) Field of Classification Search
CPC ...... G02B 7/008; G02B 7/00; G02B 21/0004; G02B 21/24; G02B 21/26; G02B 21/28; G02B 21/34; G01N 1/28; G01N 1/2813; G01N 2001/2826
USPC ....... 359/395, 391, 392, 393, 394, 398, 362; 435/176, 177, 180, 283.1, 287.1, 288.3, 435/288.4, 288.5, 305.1, 305.2; 436/174, 436/176, 177, 807, 809; 206/316.1, 456; 73/863, 863.01, 863.11, 863.81, 863.83, 73/863.86, 864.91; 356/36, 38, 244, 246
See application file for complete search history.

(56) References Cited

U.S. PATENT DOCUMENTS

| | | |
|---|---|---|
| 3,247,721 A | 4/1966 | Julius |
| 3,773,439 A | 11/1973 | Sheridan |
| 4,235,711 A | 11/1980 | Koblanski |
| 4,257,346 A | 3/1981 | Ornstein et al. |
| 4,377,476 A | 3/1983 | Ferrara |
| 5,176,446 A | 1/1993 | Chiba et al. |

(Continued)

*Primary Examiner* — Arnel C Lavarias

(74) *Attorney, Agent, or Firm* — Jeffrey Schox; Ivan Wong

(57) ABSTRACT

One embodiment includes a system for mounting a specimen on a slide, the system having an immersion chamber, a stage, and a pump. The immersion chamber is configured to hold a liquid and includes at least one wall, a closed bottom, and an open top. The stage is configured to support the slide, and the stage is arranged within the immersion chamber such that the specimen may be supported substantially above the stage by the liquid. The pump is configured to draw the liquid from the immersion chamber such that the level of liquid in the immersion chamber decreases and the specimen is dispensed onto the slide.

20 Claims, 2 Drawing Sheets

(56) References Cited

U.S. PATENT DOCUMENTS

| | | | |
|---|---|---|---|
| 5,579,399 A | 11/1996 | Lucas | |
| 5,837,198 A | 11/1998 | Itani | |
| 5,961,298 A | 10/1999 | Bar-Cohen et al. | |
| 6,623,634 B1 | 9/2003 | Whitehurst | |
| 7,521,021 B2 | 4/2009 | McCormick | |
| 7,600,457 B2 | 10/2009 | Voneiff et al. | |
| 9,042,013 B2 * | 5/2015 | Alessi | G02B 21/34 359/391 |
| 9,052,522 B2 * | 6/2015 | Alessi | G02B 21/34 |
| 9,658,441 B2 * | 5/2017 | Alessi | G02B 21/34 |
| 2003/0077815 A1 | 4/2003 | Omata | |
| 2006/0281119 A1 | 12/2006 | Chan et al. | |
| 2008/0257074 A1 | 10/2008 | Fuchiwaki et al. | |
| 2011/0299158 A1 | 12/2011 | Alessi | |
| 2015/0226951 A1 | 8/2015 | Alessi | |
| 2017/0329119 A9 * | 11/2017 | Alessi | G02B 21/34 |

\* cited by examiner

SYSTEM AND METHOD FOR MOUNTING A SPECIMEN ON A SLIDE

CROSS-REFERENCE TO RELATED APPLICATIONS

This application is a continuation application of U.S. application Ser. No. 13/153,049, filed on 3 Jun. 2011, which claims the benefit of U.S. Provisional Application No. 61/351,180 filed 3 Jun. 2010, which are each incorporated in its entirety by this reference.

TECHNICAL FIELD

This invention relates generally to the biological research field, and more specifically to a new system and method for mounting a specimen on a slide.

BACKGROUND

It is commonly desirable in biological laboratories to mount tissue sections, or 'specimens', to slides for purposes of examining the tissue sections using a microscope, treating the tissue sections with a stain or dye, and for other purposes. As shown in FIG. 1, conventional systems and methods for mounting specimens onto slides comprise placing tissue sections in a tall Petri dish filled with water; the specimens typically float on the surface of the water. The broad side of a slide is then rested on the rim of the Petri dish and the slide is angled down into the Petri dish such that the slide is partially submersed in the water. Subsequently, a small brush or glass capillary tube is used to manipulate a tissue section onto the slide. Typically, the slide is gradually drawn out of the water as additional tissue sections are arranged on the slide. Oftentimes, tissue is embedded in paraffin wax, sliced with a microtome, and then selected sections of the tissue are transferred to a hot water bath. The hot water bath partially melts the paraffin from around the specimens, and a glass slide treated with adherents is then used to scoop the tissue sections out of the hot water bath; the wax may help the tissue sections adhere to the slide. Conventional methods of mounting specimens on slides are thus difficult, time-consuming, and labor-intensive.

Therefore there is a need in the biological research field for a new system and a new method for mounting specimens onto slides. This invention provides such a system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

Figure 1:
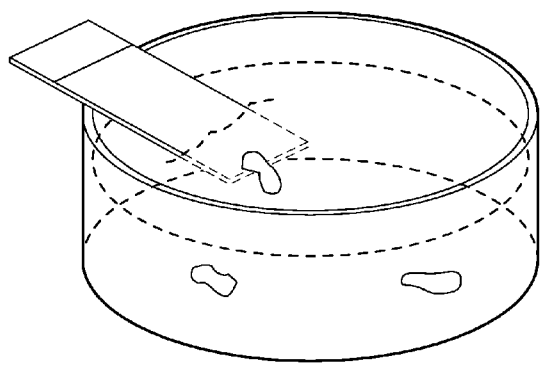
FIG. 1 is an illustration showing prior art systems and methods for mounting specimens onto slides.
Figure 2:
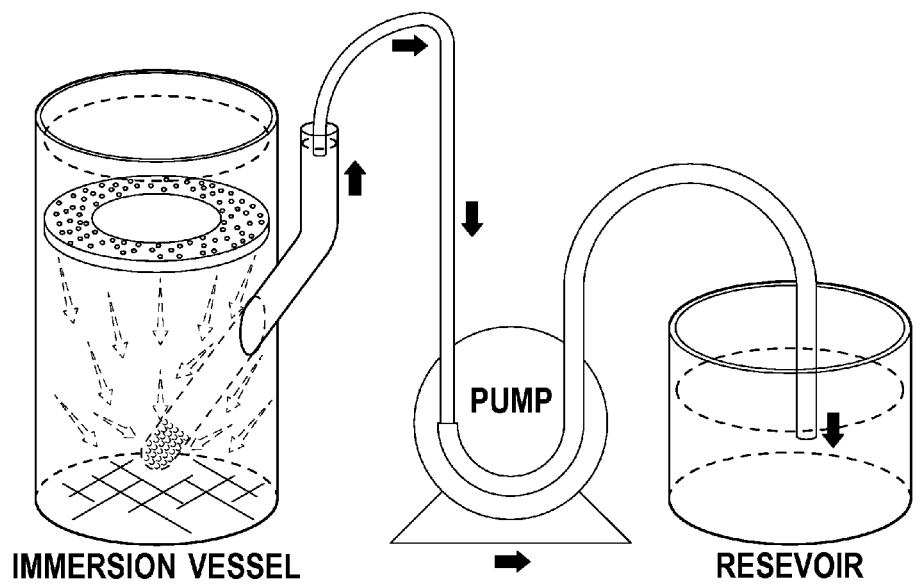
FIGS. 2, 3, 4, and 5 are illustrations of a system for mounting specimens onto slides according to various embodiments of the invention.
Figure 3:
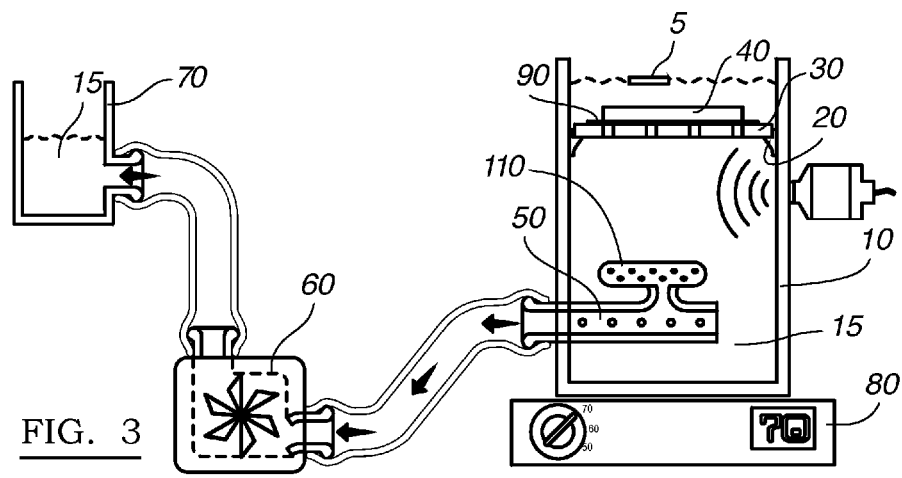
Figure 4:
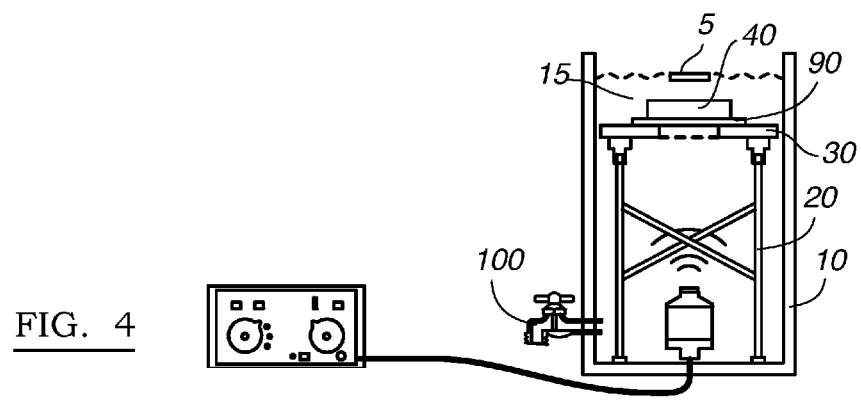
Figure 5:
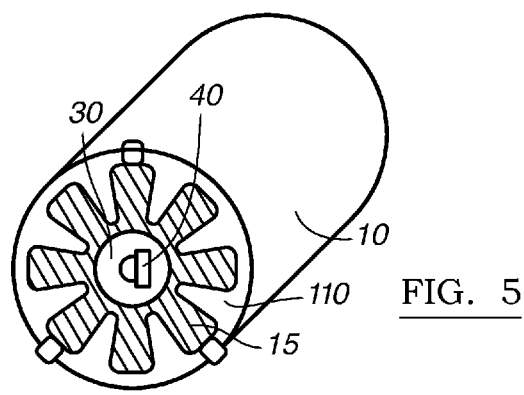

As shown in FIGS. 3 and 4, the system for mounting a specimen 5 onto a slide 40 includes an immersion chamber 10 that holds a liquid 15; a stage 30 that locates a slide 40; and a device that draws the liquid 15 from the immersion chamber 10, which can be a pump 60 (shown in FIG. 3), a valve 100 (shown in FIG. 4), or any other suitable device. The system may also incorporate a manifold 50 (shown in FIG. 3) that allows liquid 15 to be drawn from the immersion chamber 10 from a plurality of locations, such as at two points at the bottom of the immersion chamber 10 or from one point at the bottom and one point in the middle of the immersion chamber 10. A support structure 20 that locates the stage 30 may also be included in the system. The system preferably incorporates a reservoir 70 that functions to contain liquid 15 drawn from the immersion chamber 10 (shown in FIG. 3). Furthermore, the system may incorporate a temperature control unit 80 that modifies or maintains the temperature of the liquid in or drawn from the immersion chamber 10 (shown in FIG. 3). Preferably, the system includes a filter 90 that separates debris, such as wax or pieces of the specimen 5, from the liquid so that the quality of the liquid in the system can be maintained (shown in FIGS. 3 and 4). Finally, the system may also incorporate a baffle 110 that minimizes motion of the liquid tangent to the surface of the liquid 15, specifically at or near the surface of the liquid (shown in FIG. 5).

The method of mounting the specimen on the slide comprises several steps: The first step of the method is to place a slide 40 (or plurality of slides) on top of a stage 30 that is arranged substantially within an immersion chamber 10, wherein the stage 30 is substantially above the bottom of and substantially below the top of the immersion chamber 10. The immersion chamber is then filled with a liquid, preferably deionized water, such that at least a portion of the slide 40 is immersed in the liquid and the surface of the liquid is below the top of the immersion chamber 10. At this point, the specimen 5 (or a plurality of specimens) is placed in the liquid such that the specimen is arranged above at least a portion of the slide 40; because the liquid is preferably denser than the specimen 5, the specimen 5 floats on the surface of the liquid. The liquid is then drawn from the immersion chamber 10, such as by a pump 60 or by gravity through a valve 100. As the liquid is drawn from the immersion chamber 10, the surface of the liquid lowers within the immersion chamber 10, and the specimen 5, which is still floating on the surface of the liquid, approaches the slide 40. Once the surface of the liquid lowers beyond the slide 40, the specimen 5 is deposited on slide 40. The portion of the slide 40 on which the specimen 5 is mounted may be drawn from the liquid, and an additional specimen may be deposited on the slide in like manner but on a different portion of the slide 40. Once an appropriate number of specimens are mounted on the slide 40, the slide 40 with mounted specimen(s) may be removed from the immersion chamber 10 and allowed to dry. This process may then be repeated for a new slide and specimen(s).

The system preferably incorporates an immersion chamber 10 configured to hold a liquid. The density of the liquid is preferably more than the density of the specimen 5 so that the specimen 5 will float on the liquid. The liquid is preferably deionized water, but any other suitable liquid may be chosen such that the density of the liquid is more than the density of the specimen 5. However, additives may also be mixed into the liquid in order to alter the density of the liquid such that the specimen 5 will float on or be suspended in the liquid. Alternatively, a gas may also be bubbled into the liquid in order to reduce the density of the liquid.

The immersion chamber 10 of the preferred embodiment functions to hold the liquid. The liquid is retained within the immersion chamber 10 by a cavity defined by at least one side, a top that is preferably open, and a bottom that is preferably closed. The height of the immersion chamber 10 is preferably greater than its diameter (or width). For example, the immersion chamber 10 may be approximately ten inches tall and approximately six inches in diameter (or width). The immersion chamber 10 is preferably approximately circular, which promotes laminar (or non-turbulent) fluid flow of the liquid when the liquid is drawn from the immersion chamber 10. Laminar fluid flow promotes efficient deposition of the specimen 5 onto the slide 40 while also minimizing any possible damage to the specimen 5. One end of the immersion chamber 10 is preferably flat and completely sealed, while the other end is preferably completely open. The immersion chamber 10 may, however, have any suitable shape and may have any suitable height-to-width ratio. The immersion chamber 10 may also incorporate a plurality of partitions into each of which one or more specimens may be placed over one or more slides. In this embodiment, the partitions may aid in guiding the specimen 5 onto the slide 40 as the liquid is drawn from the immersion chamber 10. Alternatively, the immersion chamber 10 may be one of an assembly of multiple immersion chambers arranged such that the immersion chambers are linked with fluid passages. In this alternative embodiment, the liquid may be drawn from or added to the plurality of immersion chambers concurrently, and a specimen 5 may be mounted on a slide 40 in each immersion chamber 10, thus increasing the throughput of the system per unit of time.

The stage 30 of the preferred embodiment functions to locate the slide 40 during preparation of the specimen 5 onto the slide 40. The stage 30 is preferably arranged within the immersion chamber 10 such that the stage 30 is substantially above the bottom of and substantially below the top of the immersion chamber 10. Preferably, the stage 30 supports the slide in a substantially angled orientation, wherein an angled orientation is defined from horizontal and horizontal is defined as parallel to the surface of the liquid when the liquid is placed in the immersion chamber 10. This arrangement of the stage 30 permits the slide 40 to rest on the stage 30 at an angle such that only a portion of the slide 40 may be immersed in the liquid. Preferably, the slide 40 rests flat on a surface of the stage 30, wherein the stage is supported at an angle between seven and fifteen degrees from horizontal. Alternatively, the stage may be supported such that a significant portion of the stage 30 is parallel to the surface of the liquid in the immersion chamber, wherein the stage 30 incorporates features that support the slide at an angle between seven and fifteen degrees from the horizontal. However, the stage 30 may support the slide 40 at any other angle and by any other means. The stage 30 is preferably circular in geometry and composed of plastic. However, any other material, such as stainless steel or glass, may comprise the stage 30, and the stage 30 may be of any other geometry, such as rectangular or octagonal. Furthermore, the circumference of the stage 30 may extend substantially close to the wall (or walls) of the immersion chamber 10 or alternatively may be offset from the wall (or walls) of the immersion chamber 10 by some appreciable distance. The stage 30 preferably incorporates geometry that permits the liquid to pass from one side of the stage 30 to the opposite side of the stage 30. Preferably, the liquid passes from one side of the stage to the opposite side of the stage via a path that is sufficiently normal to at least one side of the stage. In a first example, the stage 30 may comprise an annular ring defining a central hole, such as a five-inch outer diameter ring with a four-inch diameter central hole. In a second example, the stage 30 may further define a number of small holes situated radially about a larger central hole and arranged at approximately equal intervals about the annular stage 30. In a third example, the stage 30 is comprised of a porous material, such as a fine mesh screen or foam, wherein the liquid can pass through the porous stage 30. However, the stage 30 may be of any other suitable geometry and of any other suitable material or combination of materials. In a preferred embodiment of the stage 30, the stage 30 further comprises an indexing latch that permits a user to raise the slide 40 from the immersion chamber 10 at specified height intervals, thus aiding the user in mounting multiple specimens to the slide 40 at specified intervals along the slide. The indexing latch may be incorporated such that the position of the stage 30 relative to the immersion chamber 10 does not change when the slide 40 is raised; alternatively, the indexing latch may raise the stage 30, thus raising the slide 40, which rests on the stage 30. The indexing latch may be a step block and pawl, a screw-driven platform, or any other suitable device. However, the function of the indexing latch may be achieved by lowering the height of the liquid in the immersion chamber 10 by a specified amount after each subsequent mounting of a specimen 5 on the slide 40.

The support structure 20 of the preferred embodiment functions to locate the stage 30 within the immersion chamber 10 such that when the stage 30 rests on the support structure 20 and the slide 40 rests on the stage 30, the slide 40 is at least partially submersed in the liquid without the liquid overflowing past the top of the immersion chamber 10. The support structure 20 may be integral to the immersion chamber 10. For example, the immersion chamber 10 may be comprised of a circular glass container including three equally-spaced dimples about the circumference of the cylindrical wall of the immersion chamber 10 and protruding from the cylindrical wall toward the center of the container, wherein the dimples are arranged above the bottom of and below the top of the immersion chamber 10 (shown in FIG. 3). In this example, the dimples are of a size and geometry such that the stage 30 rests on the dimples and is suitably located when placed in the immersion chamber 10. Alternatively, the support structure 20 may be separate from the immersion chamber 10. In a first example, the support structure may be a stand comprising three adjustable-length legs that rest upon the bottom of the immersion chamber 10 and which support the stage 30 (shown in FIG. 4). In this example, a user may adjust the support structure 20 to a preferred height such that the stage 30, resting upon the support structure, is suitably located within the immersion chamber 10. In a second example of a support structure 20 that is independent of the immersion chamber 10, the support structure 20 may comprise a hook that loops over a wall of the immersion chamber 10 and extends from the edge of the wall down into the immersion chamber where the support structure incorporates a geometry configured to support the stage 40 in a suitable location. Alternatively, the support structure 20 may be integral with the stage 30. For example, the stage 30 may incorporate a structure that extends upward toward the edge of a wall of the immersion chamber 10, then over the wall, forming a hook that locates the stage 30 at a suitable location within the immersion chamber 10. Furthermore, the system may not include a support structure 20 for the stage 30, but rather the stage 30 may be integral to the immersion chamber. For example, the immersion chamber 10 may be a rectilinear container comprised of folded and welded stainless steel sheet, and the stage 30 may also be comprised of stainless steel sheet welded to the interior walls of the container. However, the stage 30 may be suitably located within the immersion chamber 10 by any other method or structure.

In a first preferred embodiment, the system incorporates a pump 60 that functions to draw liquid from the immersion chamber 10. In an exemplary method of using this preferred embodiment, once the slide 40 is placed on the stage 30, the immersion chamber 10 is filled with liquid such that the liquid level is above the slide 40, and a specimen 5 is floated on the surface of the liquid. Then the pump 60 may be driven such that the level of liquid within the immersion chamber 10 lowers and the specimen approaches the slide 40. Once the specimen 5 is dispensed onto the slide 40 and is thus mounted on the slide 40, the pump 60 may be stopped so that liquid is no longer drawn from the immersion chamber 10. The pump 60 may be of any suitable type, such as a centrifugal pump, a flexible-impeller pump, a diaphragm pump, a gear pump, a rotary-vane pump, a bellows pump, or a syringe-type device. The pump 60 may also be powered by any suitable means, for example, with an electric motor, a gasoline-powered engine, or human power. Furthermore, the pump 60 may be located fully external to the immersion chamber 10, fully within the immersion chamber 10, or a combination of within and external to the immersion chamber. In a first example, the pump 60 is a centrifugal pump powered by an electric motor and arranged fully within the immersion chamber 10 such that the pump 60 rests on the bottom of the immersion chamber 10 and the inlet of the pump 60 is substantially below the slide 40. In this example, a flexible tube may be connected to the outlet of the pump 60 and arranged to pass over the top edge of a wall of the immersion chamber 10 such that the liquid may be pumped through the flexible tube and out of the immersion chamber 10. In a second example, an outlet is incorporated near the bottom of the immersion chamber 10; a nipple is fitted to the outlet and a flexible tube connects the nipple to a hand-powered bellows pump. In this second example, a user may operate the pump 60 to draw the liquid from the immersion chamber 10. However, the system may incorporate any other type of pump and any other configuration such that liquid may be drawn from the immersion chamber 10. The system may further incorporate a plurality of pumps. Preferably, the pump 60 operates at a plurality of speeds selectable by a user, and preferably at least one of these speeds produces a volume of flow substantially minimal to limit motion of the liquid in the immersion chamber 10 in a direction tangent to the surface of the liquid, particularly near the surface of the liquid. In one variation of the pump 60, the pump 60 may operate in two directions such that liquid can be both drawn from the immersion chamber 10 and pumped into the immersion chamber 10 by the same pump. Alternatively, the system may include a plurality of pumps wherein at least one pump functions to draw liquid from the immersion chamber 10 and at least one other pump functions to pump liquid into the immersion chamber 10.

In a second preferred embodiment, the system incorporates a valve 100 that functions to release liquid from the immersion chamber 10. In essence, the pump of the first preferred embodiment is replaced by a valve and gravitational force in the second preferred embodiment. In an exemplary method of using this preferred embodiment, once the slide 40 is placed on the stage 30, the immersion chamber 10 is filled with liquid such that the liquid level is above the slide 40, and a specimen 5 is floated on the surface of the liquid. Then the valve 100 may then be opened so that liquid may pass through the valve 100, the level of liquid within the immersion chamber 10 lowers, and the specimen approaches the slide 40. Once the specimen 5 falls onto the slide 40 and is thus mounted on the slide 40, the valve 100 may be closed so that liquid is no longer released from the immersion chamber 10. The valve 100 may be of any suitable type, such as a globe valve, a ball valve, a gate valve, a diaphragm valve, or a butterfly valve. In the variation of the system that uses a valve 100 to release liquid from the immersion chamber 10, an outlet may be arranged on the immersion chamber 10 such that the outlet is below the slide 40 when the slide 40 is placed on the stage 30. The valve 100 may be installed directly on the immersion chamber 10 at the outlet, but it may also be arranged substantially remote from the immersion chamber 10. For example, a tube may connect the outlet of the immersion chamber 10 to the valve 100. The tube may be a flexible hose or a hard line, and the tube may be permanently connected to the immersion chamber 10 (such as by a weld or braze) or temporarily connected to the immersion chamber 10 (as in a flexible tube coupled to a nipple installed in the outlet). However, the valve may be of any other type, arranged in any other location, and connected to the immersion chamber 10 by any other suitable method. There also may be any number of valves, and the system may incorporate both a valve 100 and a pump 60.

The reservoir 70 of the preferred embodiment functions to contain the liquid drawn from the immersion chamber 10 by the pump 60 or released from the immersion chamber 10 by the valve 100. The reservoir 70 may be arranged substantially remote from the immersion chamber 10, or the reservoir 70 may be a separate section or portion of the immersion chamber 10. In the first variation that incorporates a remote reservoir 70, the reservoir 70 is preferably connected to the immersion chamber 10 by a conduit, such as a tube, hose, or hard line, which permits the liquid to pass from the immersion chamber 10 to the reservoir 70. Furthermore, for the first embodiment (which incorporates the pump 60), the pump may be arranged substantially within the immersion chamber 10 and a conduit may connect on one end to the outlet of the pump 60 and on the other end to the remote reservoir 70. Alternatively, the pump may be arranged between the immersion chamber 10 and the reservoir 70 such that a first conduit connects the pump 60 to the immersion chamber 10 and a second conduit connects the pump 60 to the reservoir 70. Finally, the pump 60 may be arranged within or on the reservoir 70 and a conduit may connect the pump 60 to the immersion chamber. In the second embodiment (which incorporates the valve 100), at least a portion of the reservoir 70 is preferably arranged substantially below the outlet of the valve so that gravity may draw liquid out of the immersion chamber 10 via the valve 100 and into the reservoir 70. The system may optionally include a conduit to guide the liquid from the valve 100 into the reservoir 70.

In the second variation that incorporates the reservoir 70 as a separate section of the immersion chamber 10, the reservoir 70 may be arranged below, above, or next to the cavity comprising the immersion chamber 10. For example, the immersion chamber 10 and reservoir 70 may be comprised of folded and welded stainless steel sheet, wherein a rectilinear container includes a welded and sealed partition that defines the immersion chamber 10 on one side and the reservoir 70 on the other side. In the embodiment that incorporates a pump 60, the pump 60 may be located substantially within the immersion chamber 10, substantially within the reservoir 70, substantially between the immersion chamber 10 and the reservoir 70, or substantially remote from the immersion chamber 10 and/or the reservoir 70. However, any other arrangement of the reservoir 70, immersion chamber 10, and pump 60 and/or valve 100 may be used. Any number of reservoirs, valves, and/or pumps may also be used. Preferably, the reservoir 70 is arranged such that liquid contained in the reservoir 70 can be pumped or dumped back into the immersion chamber 10, such as by a pump or by a conveyer-bucket system, respectively.

Liquid may pass through the manifold 50 as the liquid is drawn from the immersion chamber 10 by the pump 60 or released from the immersion chamber 10 by the valve 100 (shown in FIG. 3). The manifold 50 of the preferred embodiments functions to reduce motion of the liquid in a direction tangent to the surface of the liquid in the immersion chamber 10, primarily at or near the surface of the liquid. By reducing such motion, the specimen 5 will be less likely to move along the surface of the liquid and away from the location in which the specimen 5 was placed by the user of the system. Specifically, the user of the system may place the specimen 5 substantially directly over slide 40, and if the liquid is induced to move near the surface of the liquid, the specimen 5 may be disturbed such that the specimen 5 is guided away from substantially directly over slide 40. This could result in poor or improper mounting of the specimen 5 on the slide 40 at the end of the mounting process. Therefore, the manifold 50 preferably has a plurality of inlets, wherein the arrangement of the inlets may reduce turbulence in the liquid moving toward the pump 60 or valve 100 and/or may reduce swirling of the liquid when the liquid is removed from the immersion chamber 10. However, the manifold 50 may function in other ways to limit motion of the liquid in the immersion chamber 10 in a direction tangent to the surface of the liquid and substantially proximal to the surface of the liquid. Preferably, the manifold includes at least one outlet connected to the pump 60 and/or valve 100. Several methods may be used to connect the manifold 50 to the pump 60 and/or valve 100: a separate conduit (for example, a hose or tube) may connect the elements; the manifold 50 may mate directly to the pump 60 (or pumps) or valve 100 (or valves) without the need for additional conduit; or the manifold 50 may be integral with the pump 60 or valve 100. However, any other arrangement or geometry of the manifold 50 may be used.

The baffle 110, which is arranged substantially within the immersion chamber 10, functions to reduce motion of the liquid in a direction tangent to the surface of the liquid, primarily at or near the surface of the liquid. By reducing such motion, the specimen 5 will be less likely to move along the surface of the liquid and away from the location in which the specimen 5 was placed by the user of the system. Specifically, the user of the system may place the specimen 5 substantially directly over slide 40, and if the liquid is induced to move near the surface of the liquid, the specimen 5 may be disturbed such that the specimen 5 is guided away from substantially directly over slide 40. This could result in poor or improper mounting of the specimen 5 on the slide 40 at the end of the mounting process. In a first example, the baffle 110 comprises a series of fins arranged radially within a circular immersion chamber 10; at least a portion of the fins are immersed in the liquid when at least a portion of the slide 40 is submersed in the liquid (see FIG. 5), and preferably the fins extend below the lowest part of the slide 40. In a second example, the baffle 110 comprises a screen located within the immersion chamber 10, below the slide 40 and above the inlet of the pump 60, the inlet of the valve 100, and or the inlets of the manifold 50. In a third example, the baffle 110 is in the form of a substantially wide nozzle incorporating a screen and arranged over an inlet through which the liquid is drawn from the immersion chamber 10. However, the baffle 110 may be of any other arrangement or geometry, and a plurality of baffles of similar and/or dissimilar geometries may be arranged within the immersion chamber 10.

The temperature control unit 80 functions to maintain or modify the temperature of the liquid in the system. In producing a specimen 5, oftentimes a relatively large mass of tissue is encased in wax (or another binding agent) to improve rigidity when the tissue is sliced with a microtome. Once the tissue mass is sliced and a specimen 5 is thus created, the wax may offer additional support to the specimen 5, which may improve the likelihood that the specimen 5 will lie flat on the slide once mounted thereon; thus it may be advantageous to limit the temperature of the liquid in the system so that the wax does not melt out of the specimen 5 when placed in the immersion chamber 10. Alternatively, is may be desirable to melt the wax out of the specimen 5 after the slicing process, such as to improve the ability of the specimen 5 to absorb a dye; this may be achieved by raising the temperature of the liquid in the system so that the wax melts out of the specimen 5 when placed in the immersion chamber 10. Therefore there may be an ideal temperature of the liquid used to mount the specimen 5 to the slide 40. The temperature control unit 80 may be preset for a single temperature and thus maintain the liquid in the system at this temperature. Alternatively, the temperature control unit 80 may receive an input from a user and maintain the liquid in the system at a plurality of temperatures, wherein the temperature is based upon the input. Finally, a computer or processor that operates the system may select the desired temperature and communicate this information to the temperature control unit 80, which in turn modifies the temperate of at least a portion of the liquid in the system based upon the desired temperature. In a first example, the temperature control unit 80 may comprise a heating and/or cooling plate upon which the immersion chamber 10 is arranged. In a second example, the temperature control unit 80 may include a heating element disposed substantially within the immersion chamber 10 and/or the reservoir 70. In a third example, the temperature control unit 80 may incorporate a heating and/or cooling element inline with at least a portion of the conduit between the immersion chamber 10 and the reservoir 70, pump 60, or valve 100. The temperature control unit 80 may incorporate a feedback mechanism, wherein the temperature control unit 80 measures the temperature of at least a portion of the liquid in the system and adds or removes heat from at least a portion of the liquid based upon this measurement. The temperature control unit 80 may achieve this measurement with a temperature probe, wherein the temperature probe is arranged substantially within the immersion chamber 10, substantially within the reservoir 70, or substantially within any other element of the system. Alternatively, the temperature probe may be an infrared or laser temperature sensor located substantially remote from the immersion chamber 10 or reservoir 70.

The filter 90 (i.e., a semi-permeable membrane) functions to separate debris from the liquid in the system. Debris may include a portion of the specimen 5, wax from the specimen 5, or any other contaminant. The filter 90 may be a paper filter, a screen filter, a sand filter, a charcoal filter, or any other type of filter through which the liquid may pass. In a first example, the filter 90 is a paper filter placed between the stage 30 and the slide 40 before the immersion chamber 10 is filled with liquid. In this example, when the immersion chamber 10 is filled with liquid, the liquid rises up to the stage 30, through the filter 90, and over the slide 40; when the liquid is removed from the immersion chamber 10 after the specimen 5 is floated on the surface of the liquid over the slide 40, the liquid lowers past the slide 40 and the filter 90, wherein the filter 90 catches debris and prevents the debris from passing below the stage 30. After the specimen 5 is mounted on the slide 40 and the slide-specimen assembly is removed from the immersion chamber 10, the filter 90 may be removed and, with it, the debris. In a second example, a first pump draws liquid from the immersion chamber 10 and into a the reservoir 70, and a second pump draws liquid from the reservoir 70, pumps it through a charcoal filter 90, and deposits the liquid in the reservoir 70; the charcoal filter 90 thus prevents debris from flowing back into the immersion chamber 10. The charcoal filter 90 may be cleaned or replaced at some interval. However, any suitable type, arrangement, or number of filters may be used.

The system may be controllable via a control system such as, for example, a computer. Alternatively, or additionally, the system may be controllable using manual controls affixed to one or more components of the system.

As a person skilled in the art will recognize from the previous detailed description and from the figures and claims, modifications and changes can be made to the preferred embodiments of the invention without departing from the scope of this invention as defined in the following claims.

I claim:

1. A system for mounting a specimen on a slide, the system comprising:
   an immersion chamber configured to hold a liquid;
   a stage configured to support the slide and arranged within the immersion chamber, wherein the specimen is supported above a portion of the stage by the liquid in a first operation mode;
   a liquid level modulator that enables modulation of a level of liquid in the immersion chamber, wherein in a second operation mode, the liquid level modulator reduces the level of liquid in the immersion chamber and the specimen is dispensed onto the slide; and
   a filter configured to filter debris from the liquid.

2. The system of claim 1, wherein the stage is configured to support the filter such that the filter is arranged on top of the stage and the slide is arranged above the filter.

3. The system of claim 1, further comprising a temperature control unit configured to modify a temperature of the liquid within the immersion chamber.

4. The system of claim 3, wherein the temperature control unit receives an input from a user and modifies the temperature of the liquid based upon the input.

5. The system of claim 1, further comprising a baffle arranged substantially within the immersion chamber and configured to reduce motion of the liquid substantially proximal to a surface of the liquid.

6. The system of claim 5, wherein the baffle comprises a series of fins arranged radially relative to a cylindrical wall of the immersion chamber.

7. The system of claim 1, wherein a liquid level modulator comprises a pump coupled to a manifold, and wherein the pump draws the liquid from the immersion chamber through the manifold.

8. The system of claim 1, wherein the liquid level modulator comprises a valve, positioned on a wall of the immersion chamber, that allows the liquid to leave the immersion chamber, thereby reducing the level of liquid in the immersion chamber in the second operation mode.

9. The system of claim 1, further comprising a support structure configured to position the stage within the immersion chamber.

10. The system of claim 9, wherein the support structure is integrated with a vertical wall of the immersion chamber.

11. The system of claim 1, further comprising a reservoir configured to hold liquid released from the immersion chamber by the liquid level modulator.

12. The system of claim 11, wherein the liquid level modulator comprises a pump configured to pump liquid from the reservoir into the immersion chamber.

13. The system of claim 1, wherein the stage includes at least one hole in its geometry such that the hole permits the liquid to pass from one side of the stage to the other side of the stage.

14. A system for mounting a specimen on a slide, the system comprising:
   an immersion chamber configured to hold a liquid;
   a stage situated within the immersion chamber and configured to support the slide, wherein the specimen is supported above a portion of the stage by the liquid in a first operation mode; and
   a valve configured to release the liquid from the immersion chamber in a second operation mode, such that a level of liquid in the immersion chamber decreases and the specimen is dispensed onto the slide.

15. The system of claim 14, further comprising a filtering module in communication with the liquid of the immersion chamber and configured to separate debris from the liquid.

16. The system of claim 15, wherein the filter is superior to the stage and the slide is superior to the filter.

17. The system of claim 14, further comprising a temperature control unit configured to modify a temperature of the liquid in the immersion chamber.

18. The system of claim 17, wherein the temperature control unit is configured to receive an input from a user and modifies the temperature of at least a portion of the liquid based upon the input.

19. The system of claim 14, further comprising a baffle arranged substantially within the immersion chamber and configured to reduce motion of the liquid substantially proximal to a surface of the liquid.

20. The system of claim 19, wherein the baffle comprises a series of fins arranged radially relative to a cylindrical wall of the immersion chamber.

* * * * *